United States Patent [19]

Akman

[11] 4,046,928

[45] Sept. 6, 1977

[54] ELECTRORESISTIVE PAPER

[75] Inventor: Alptekin Akman, Ontario, N.Y.

[73] Assignee: Xerox Corporation, Stamford, Conn.

[21] Appl. No.: 322,048

[22] Filed: Jan. 8, 1973

[51] Int. Cl.[2] .......................... B05D 5/12; B32B 29/00

[52] U.S. Cl. ...................................... 427/12; 427/121; 427/122; 427/126; 427/288; 427/411; 428/536; 428/538; 428/539

[58] Field of Search ............... 117/216, 218, 215, 226, 117/155 R; 204/2; 428/536, 538, 539; 427/271, 288, 411, 419 R, 419 D, 122, 121, 355, 358, 12, 126; 346/135

[56] References Cited

U.S. PATENT DOCUMENTS

| | | | |
|---|---|---|---|
| 2,555,321 | 6/1951 | Dalton et al. | 204/2 |
| 3,263,604 | 8/1966 | Dalton | 204/2 |
| 3,442,699 | 5/1969 | Dalton | 117/216 |
| 3,511,700 | 5/1970 | Miro | 117/201 |

*Primary Examiner*—Cameron K. Weiffenbach

[57] ABSTRACT

This invention relates to an electrosensitive marking blank having a blushed conductive layer and a pigment containing blushed masking layer. The instant electrosensitive element has particular utility in that a relatively thin masking layer in combination with a blushed conductive layer results in a blank having improved whiteness and contrast characteristics.

6 Claims, 2 Drawing Figures

ELECTRORESISTIVE PAPER

BACKGROUND OF THE INVENTION

This invention relates to electrosensitive recording blanks, and in particular, recording elements which respond to the action of electric currents or potentials applied thereto as, for example, telefacsimile signals and the like.

In the facsimile recording art, two types of recording blanks are well known, namely, a photographic type and the direct recording type. The photographic blank suffers from the disadvantage that the recording machine must be operated under darkroom conditions and comparatively expensive photographic developing equipment and operations are required before a complete record is obtained. However, the direct recording blank is capable of use under normal light conditions, and the record is immediately and permanently produced as the electric signals are being received.

One kind of direct recording blank that has been found universally useful contains a backing, or web of paper, which has a masking coating applied thereto, which coating is removeable in localized areas in response to applied electrical signals, so as to expose the contrasting undersurface which is usually black. In such blanks, the electrical characteristics of the blank, or substrate, material are of extreme importance. Therefore, in one type of substrate the paper backing is itself rendered electrically conductive to a predetermined degree by incorporating in the paper itself a conductive material such as powdered carbon or carbon black. In another well known type of blank, the paper backing can be of any kind of paper and has its surface treated or coated with a conducting material, generally powdered carbon, to impart the necessary blackness and conductivity.

In both the aforementioned types of electrosensitive elements, the black undersurface is masked by the white overcoating. Since it is the masking coating which responds to the applied electric signals, by way of removal, and the recording is effected by the electric stylus acting on successive elemental areas of same, it is apparent that the electrical characteristics of the masking coating are of great importance if satisfactory recordings are to be achieved.

Generally, a masking coating derives its contrasting hue with the black undersurface by having incorporated therein a conventional white pigment such as titanium oxide, zinc oxide, and the like, together with a resin binder such as a cellulose ester or ether. While such prior electrosensitive elements have been found satisfactory for most uses, they have in many cases suffered from the disadvantage that, in order to achieve the desired electric properties for the masking coating, it has been necessary to apply an extremely light masking coating. Due to the thinness of the masking layer, the blank appears gray in color instead of having a true whitish hue. The result is that when the masking coating is removed by the applied electric signals, the contrast between the unremoved areas and the black undersurface is not the most desirable. This deficient contrast may even render the record unreadable at very low levels of illumination. In addition, since the pigment in the masking layer consists of discreet physical particles, any microscopic spaces or pores between the individual particles detracts from the total masking affect and may decrease the total whitish appearance of the coat.

In order to overcome some of the aforementioned deficiencies with regard to pigmented masking layers in electrosensitive marking blanks and achieve a maximum masking affect, it was necessary to employ a masking coat which was not below a certain minimum thickness. Since the masking coat is the sensitive layer, in that it must be removed or disintegrated by the electric discharges applied thereto, either in the form of a minute arc, spark, or corona discharge, the necessary increase in thickness to achieve the desired masking quality is contrary to the marking sensitivity of the electrosensitive element to the recording signals.

In yet another alternative to the difficulties presented by a pigmented masking layer, U.S. Pat. No. 3,511,700 to Miro discloses a recording blank having a masking layer comprising a blush coating including a resin binder and a pigment. The combination of blushing and the white pigment afforded a masking layer which maintained the contrast between the recorded and unrecorded areas in the electrosensitive marking element. While this particular electrosensitive element provides desirable white masking layer and acceptable tonal response, there remains a continuing need to improve the thickness of the masking layer as well as its whiteness.

Yet another difficultly encountered with electrosensitive or electroresistive marking elements is the problem of smoke formation and ash residue. During the facsimile process the electric discharge or recording current is usually applied to means of a needle pointed electrically energized stylus. During the existence of the recording discharge or current, the masking coating is disintegrated or removed by a quasi-explosive action. The achieve the required sensitivity of recording, therefore, a certain minimum amount of electric power must be used to achieve the desired explosion or disintegration of the masking coating beneath the stylus. During the discharge process resulting in the disintegration of the coating material, smoke, as well as combustion residue, is engendered. While the ash and smoke formation may have been of no consequence in facsimile processes of the past, present day high-speed telecommunications copiers using the facsimile process require marking elements devoid of these particular difficulties.

As can be ascertained from the above, there is a continuing need for electrosensitive marking elements which provide optimum electrical response and tonal contrast and are usable in high-speed facsimile machines.

BRIEF DESCRIPTION OF THE INVENTION

In accordance with the instant invention, there is provided an electroresistive recording element having a blush conductive coating and a pigmented masking layer coated on said conductive layer and the preparation of same. Specifically, there is prepared an electrosensitive blank containing both a blushed conductive contrasting layer and a blushed masking layer of sufficient thickness to provide optimum whiteness, tonal, and electrical characteristics. The present recording element may be prepared by a separate blushing step for each layer on the simultaneous blushing of both.

DETAILED DESCRIPTION OF THE DRAWINGS

Figure 1:
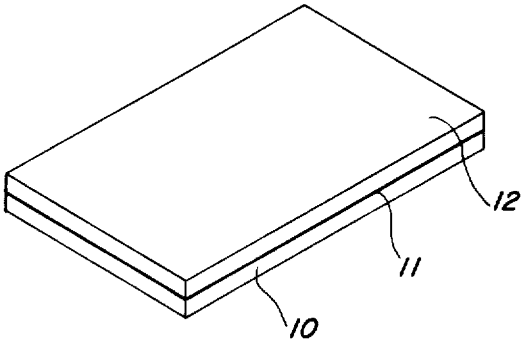
FIG. 1 is a prospective view, partly sectional, of one form of recording blank according to the instant invention.

Referring to FIG. 1, there is shown a blank comprising a backing 10 which may be of a nonconductive material; such as, paper, cardboard, fiber, plastic, metal or the like. Adherently attached to the backing 10 is a dark colored coating 11 which may include a powdered conductive material; such as, carbon, or powdered metal in a blushed film-forming binder. Typical formulations for coating 11 include the use of conductive carbon in a film-forming binder selected from a wide variety of water and soluble thermoplastic film-forming polymeric resins. The upper surface of the backing is provided with a masking coat 12 which is white in color so that upon its selective removal by a recording stylus, the dark appearance of the intermediate blush conductive layer shows through the particularly minute areas of masking coating 12 which have been either wholly or partly removed or disintegrated by the electrically energized stylus.

In accordance with the invention, the blushed conductive layer 11 is formulated so that it contains a certain percentage of conductive particles; such as carbon or metal and the like, together with a film-forming binder or combination of binders together with a solvent for said materials and a plasticizer so that the coat 11 can be applied to the backing 10 in a liquid or semi-liquid form. In order to achieve a blushing effect in either layer, it is generally necessary to utilize incompatible solvents in the particular coating batch. If simultaneous blushing is to take place in both layers, a solvent must be used in the masking layer which is incompatible with the resin used in the conductive layer.

Also in accordance with the instant invention, the masking coat 12 is formulated that it contains sufficient whitish pigment; such as zinc oxide, zinc sulfide, titanium dioxide, and the like, or a mixture of such pigments together with a film-forming binder or combination of binders together with a solvent for the binder and a plasticizer so that the coat can be applied to the conductive carbon layer 11 in a liquid or semi-liquid form. By reason of the composition of the coating batch, it is such that when it is dried, it assumes a whitish blushing effect. This whitish blushing compliments both the whitish appearance of the white pigment, or pigments, and the partial masking blush in the conductive layer. By virtue of the dual blushing effect and the pigment in the masking layer, an electroresistive element is produced which has a very effective white face which enables excellent contrast with the conductive carbon layer upon removal during stylus recording.

In the past, blush coatings have been employed for various uses and have generally involved the use of a lacquer together with substantial percentage of water in the coating batch to achieve the whitish blushing effect. However, in the electrosensitive layered element shown in FIG. 1, not only is it necessary to obtain a blushing effect in each layer but it must be done in such a way that it does not weaken the continuous film resulting from the drying of each coat on the backing 10. Therefore, it is preferred, according to the present invention, to prepare the coating batch for each layer so that each is substantially and entirely free from water. In accordance with the invention film-forming binders for each layer are chosen so that they obtain their white blush from the use of incompatible organic solvents or the normal moisture in the air when the coating is dried on the Backing 10.

Within the purview of the instant invention, there are two alternative means for accomplishing blushing of both the conductive carbon and the white masking pigment layer. The first involves blushing of the conductive carbon layer separately, as by the use of an incompatible solvent in said layer, then drying and covering with a blush pigment masking coating. A second process invention simultaneous double blushing of both layers in which a solvent is employed in the pigmented masking layer to gel and precipitate the film-forming resin employed with the layer conductive carbon layer and thereby cause blushing on both the carbon and pigmented layer simultaneously. The latter is accomplished by coating a base such as paper first with a non-blushable lacquer, such as cellulose acetate in acetone, containing carbon pigment and thereafter drying said layer to its solid black color. This conductive carbon layer is then in turn coated with a blushable lacquer, comprising conductive and nonconductive zinc oxide, cellulose acetate butyrate, acetone and N-butanol. Because the cellulose acetate of the conductive carbon layer is gelled by acetone and precipitated by N-butanol, the conductive carbon layer is effectively blushed during the application of the blushable pigmented masking layer. The resulting double blushed electroresistive paper of either process is effectively whiter than heretofore known due to said double blushing. In addition, the outer white masking layer can be applied in very thin form thereby resulting in a virtually smokeless facsimile paper.

The above mentioned advantages and other features of the instant invention are further illustrated by the following examples and specific embodiments of the invention.

DESCRIPTION OF PREFERRED EMBODIMENTS

The following are typical examples of formulations of coating batches to make the blush layers 11 and 12 of FIG. 1:

EXAMPLE 1

The following is a batch formulation in parts by weight for high-conductive layer 11:

| | |
|---|---|
| acetone | 192 lbs. |
| methyl alcohol | 48 lbs. |
| cellulose acetate butyrate | 20 lbs. |
| carbon black (X.C.-72, manufactured by the Cabot Corp.) | 4 lbs. |
| dibutyl phthalate (plasticizer) | 12 lbs. |

The cellulose acetate butyrate is dissolved with stirring in the acetone-methyl alcohol solution. After complete solution of the resin, the carbon black is dispersed in the solution until a smooth dispersion is formed. The dibutyl phthalate plasticizer is then added with continued stirring. The solution is then applied by means of blade coating to an 8 × 12 inch sheet of bond paper. Upon drying layer 11 appears not as a black layer but rather as a grey tint dye to the blushed resin composition.

The following is the formulation for white pigmented blushed masking layer 12:

| | |
|---|---|
| methyl ethyl ketone | 100 lbs. |
| butyl alcohol | 110 lbs. |
| cellulose acetate butyrate | 20 lbs. |
| zinc palmitate | 5 lbs. |
| conductive zinc oxide | 20 lbs. |
| non conductive zinc oxide | 42 lbs. |

The cellulose acetate butyrate resin is dissolved in the ketone-alcohol solution with stirring. Thereafter the plasticizer is dissolved in the resin solution. Both the conductive and non-conductive pigments are then dispersed in the solution until a smooth milky white dispersion is formed. The solution is then applied by means of a blade coating to layer 11 formed on the bond paper referred to above. After drying the final appearance of the paper is a very bright white.

As pointed out above, the instant electroresistive element may be prepared utilizing a simultaneous blushing technique. Generally, a resin is chosen for the conductive layer which is incompatible with a solvent, or solvents, utilized in the preparation of the masking pigmented layer 12. In this instance when the pigmented masking layer 12 is applied to conductive layer 11, it results in the gelling and precipitation of the resin binder in the conductive carbon layer 11. By either technique an improved white electrosensitive recording element is prepared which requires a very thin masking layer. The electroresistive paper prepared in the present example was found to be particularly effective as a smokeless recording medium for high-speed facsimile recording.

Figure 2:
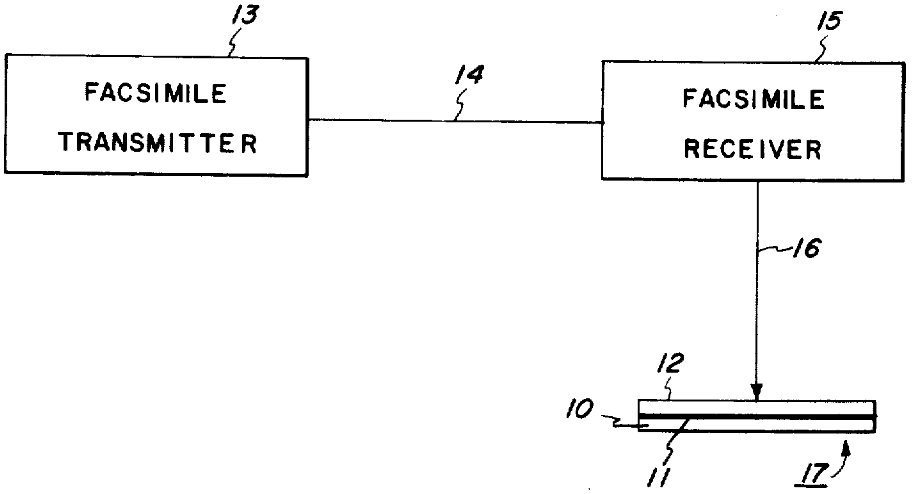
FIG. 2 is a schematic diagram of a telefacsimile recording system utilizing a blank according to the invention.

Referring now to FIG. 2, there is shown in general schematic form, a telefacsimile recording and duplicating system wherein numeral 13 represents any well known form of telefacsimile transmitter whereby the subject matter to be transmitted is scanned in successive areas of elemental size to produce corresponding electric signals. These signals are transmitted over a suitable transmission channel 14 to the facsimile transmitter 15, the output of which is applied to the recording needle 16. The needle 16 is in slight contact with the recording blank 17 which may be on a moveable or stationary element depending on the type of facsimile machine. The recording blank is formed of a base of paper having two superposed layers corresponding respectively to layers 11 and 12 of FIG. 1. As a result of the potential at the needle electrode 16, the masking or facsimile layer is removed at the points corresponding to the original subject matter scanned at the transmitter 13 thus exposing the blushed gray conducting layer 11. Therefore, the subject matter transmitted at 13 is directly reproduced on blank 17.

The resin employed in the present invention may be any one of a variety of thermoplastic, film-forming, polymeric materials. Those materials commonly used in making lacquers are particularly desirable. Among suitable material of various cellulose derivatives, including nitrocellulose, cellulose esters; such as cellulose acetate or cellulose acetate butyrate, cellulose ethers; such as ethyl cellulose, vinyl polymers; such as copolymers of vinyl chloride and vinyl acetate, acrylic and methacrylic polymers; such as polymethylmethacrylate, and many other materials of this nature well known to those skilled in the art.

A wide variety of volatile organic liquid solvents are suitable for use in the present invention, among which are chloroform, ethylene dichloride, trichloroethylene dioxide, trichloroethylene dioxide, methyl acetate, ethyl acetate, acetone, benzene, isopropylacetate and the like, as well as mixtures of these materials with each other. In the case of certain solvents; such as benzene and isopropylacetate which tend to form gels with certain resins; such as ethyl cellulose, it is desirable to employ also a small amount of ethyl alcohol to provide a clear free-flowing solution.

As can be ascertained from the examples it has also been found desirable in many cases to incorporate in the solution a water soluble plasticizer or softening agent for the resin in order to provide a finished product having maximum sensitivity to the arc of the stylus. A wide variety of suitable plasticizers for such resinous composition is well known and commonly available. These plasticizing materials not only provide improved sensitivity to the stylus, but also in many cases provide improved whiteness of the blushed opaque coatings and better adhesion of the conductive coating to the paper or other backing material. It is usually desirable to employ relatively small proportions of such plasticizers, of the order of 10 to 50 percent by weight of the resin, since increasing the quantity of such plasticizers usually tends to have an adverse effect on the development of the blush and opaqueness of the coating.

Although specific embodiments of the invention have been described herein, it is not intended to limit the invention solely thereto, but to include all of the obvious variations and modifications in the spirit and scope of the appended claims.

What is claimed is:

1. An electrosensitive marking blank comprising:

a. a substrate;

b. a blushed opaque conductive layer coated on said substrate said conductive layer including conductive carbon in a film-forming binder of cellulose acetate butyrate; and c. a contrasting masking layer overlaying said conductive coating said masking layer containing a pigment and film-forming binder said masking layer completely overlaying said conductive coating in order to provide contrast with the conductive layer upon electrical stylus removal of the opaque masking layer.

2. The electrosensitive marking blank of claim 1 wherein the substrate is paper.

3. The electrosensitive marking blank of claim 1 wherein the masking layer comprises zinc oxide pigment and cellulose acetate butyrate as the film-forming binder.

4. The electrosensitive marking blank of claim 1 wherein the conductive carbon is in the form of graphite.

5. A method of facsimile recording comprising applying an electrical stylus to the electrosensitive marking blank of claim 1.

6. A process for making an electrosensitive marking blank of improved contrast comprising:

a. blush coating a conductive material in a film-forming binder on a substrate to effect an opaque conductive coating thereon; and b. blush coating a contrasting pigment and film-blushing binder over the conductive coating in order to completely mask the conductive layer.

* * * * *